United States Patent [19]

Yoshida et al.

[11] Patent Number: 5,295,087
[45] Date of Patent: Mar. 15, 1994

[54] METHOD OF SIMULATING TIRE TREAD NOISE AND SIMULATOR THEREFOR

[75] Inventors: Masahiro Yoshida, Kodaira; Masahiro Takayama, Nishitama, both of Japan

[73] Assignee: Bridgestone Corporation, Tokyo, Japan

[21] Appl. No.: 771,213

[22] Filed: Oct. 4, 1991

[30] Foreign Application Priority Data

Oct. 11, 1990 [JP] Japan .................................. 2-272718

[51] Int. Cl.$^5$ ........................ G06G 3/08; G06F 15/20
[52] U.S. Cl. ..................... 364/578; 364/508; 364/512; 364/524; 152/209 R; 152/209 D; 73/146
[58] Field of Search ............... 152/209 R, 209 D, 209; 340/446; 73/146, 578; 364/557, 508, 574, 569, 512; 381/61; 446/397

[56] References Cited

U.S. PATENT DOCUMENTS 3,989,780  11/1976  Vorih .
4,727,501  2/1988  Parker et al. .
4,788,651  11/1988  Parker et al. ...................... 364/574

FOREIGN PATENT DOCUMENTS 0329927  8/1989  European Pat. Off. .
0402021  12/1990  European Pat. Off. .

OTHER PUBLICATIONS

Pope, Basic Studies of Automobile Tire Noise, May 1978, pp. IV-V, 29-30, 50.

Primary Examiner—Kevin J. Teska
Assistant Examiner—Kamini Shah
Attorney, Agent, or Firm—Oliff & Berridge

[57] ABSTRACT

A method of simulating noise generated by a tire using a computer, wherein waveforms of the sounds are determined, considering the phase, of which sounds originate from sources of sound, namely, a leading edge which is an edge of the load-supporting portion of the tread and first contacts the road surface when the tire rotates, and a trailing edge positioned opposite to the leading edge. The so-determined waveforms of the sound are integrated over the entire surface of the tread, after that, audible sound of the integrated waveforms is emitted from a headphone as tire-noise.

10 Claims, 6 Drawing Sheets

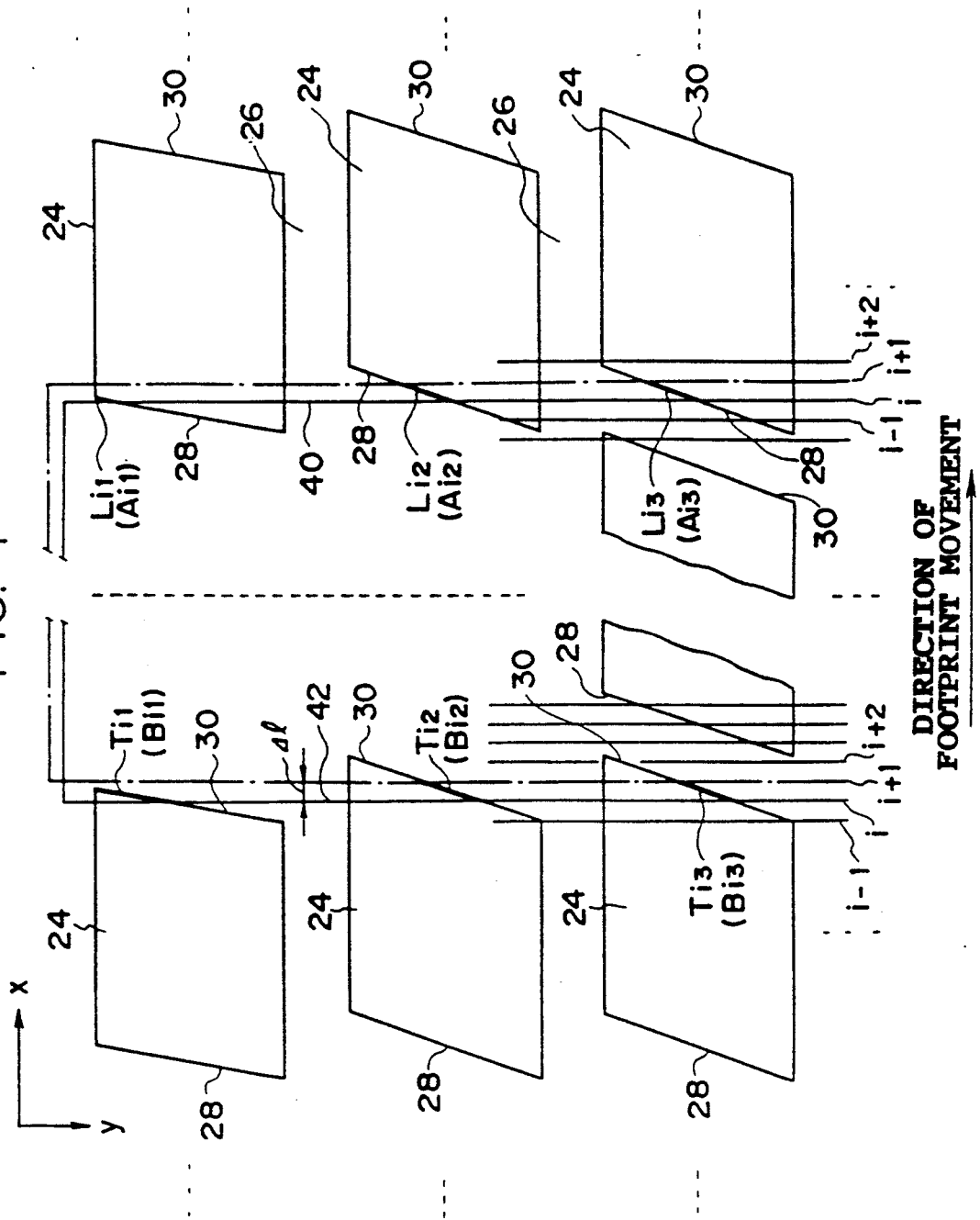

SIMULATION

ACTUAL NOISE

FREQUENCY (Hz)

METHOD OF SIMULATING TIRE TREAD NOISE AND SIMULATOR THEREFOR

BACKGROUND OF THE INVENTION

1. Field of the Invention

The present invention relates to a method of simulating tire tread noise and a simulator therefor. More specifically, the present invention relates to a method of simulating tire tread noise and a simulator of tire tread noise whereby tire noise with high fidelity can be generated.

2. Description of the Related Art

The method of simulating tire tread noise on which the present invention is based is disclosed in U.S. Pat. Nos. 4,727,501 and 4,788,651. In this method, a tread surface is represented as a large number of matrix elements on a coordinate system in order to distinguish between load-supporting portions (i.e. lugs) and grooves of the tread, to thereby determine a contour of a front edge of a contact portion (footprint) of the tread which comes into contact with the road surface, or a contour of a rear edge of this contact portion, in accordance with an equation. Then, the waveforms of sound generated from each of the matrix elements, which are sound sources, are determined and the waveforms of sound are integrated over the contours of the front edge or the rear edge of the footprint. Next the so-integrated value is further integrated along the direction of the circumference of the tire, and audible sound is generated on the basis of the integrated value, thereby simulating tire tread noise.

When the load-supporting portion of the tread comes into contact with the road surface and when the load-supporting portion which has contacted the road surface separates from the road surface, the contacting portion of the load-supporting portion which comes into contact with the road surface and another portion of the load-supporting portion which separates from the road surface are sources of vibration, and cause the tread rubber to vibrate. The vibration of the tread rubber is transmitted to the side walls of the tire and thus, tire tread noise is generated. This is understood by inventors of the present invention. However, in the conventional simulating method, the waveform of sound has been integrated along either the contour of the front edge or the contour of the rear edge of the footprint, by assuming that the entire surface of the load-supporting portion will be a source of sound, without specifying the actual portions thereof which constitute the sound source. As a result, there exists a problem that it is not possible to simulate the sound with high fidelity by such a technique since it is not possible to integrate sound generated from the actual source of sound, and also not possible to integrate sound, considering the phase of the sound.

SUMMARY OF THE INVENTION

The present invention is provided in order to solve the afore-mentioned problems. It is therefore an object of this invention to provide a method of simulating tire tread noise and a simulator therefor whereby tire noise with high fidelity can be generated by integrating a sound wave, by using, as a source of sound, a portion adjacent to a generating portion of the actual tire noise, in consideration of the phase of the sound.

The method of simulating tire tread noise in accordance with the present invention, in order to achieve the afore-mentioned object, is to simulate tire tread noise which occurs during the rotation of a tire which has a plurality of load supporting portions on a tread. The method is comprised of the following steps:

representing the tread so as to distinguish between a leading edge which is the edge of the load-supporting portion of the tread which first comes into contact with the road surface as the tire rotates, and a trailing edge which is the edge of the load-supporting portion which last comes into contact with the road surface as the tire rotates;

determining a contour of a front edge of a contact portion of the tread, which is in contact with the road surface which is positioned at the forward portion of the contact portion which has not yet contacted the road surface and which is in contact with the road surface during the rotation of the tire, and a contour of a rear edge of the contact portion of the tread which is located at the rearward portion of the contact portion which is still in contact with the road surface and which separates from the road surface during the rotation of the tire;

determining wave forms of sounds, considering the phase, which originate at sources of sound which are, respectively, a portion of a leading edge which crosses the contour of the front edge of the contact portion during a unit time, and a portion of a trailing edge which crosses the contour of the rear edge of the contact portion during the unit time, when the contours of the front edge and rear edge of the contact portion and the tread are relatively moved so as to move the contours of the front edge and rear edge of the contact portion in the direction of circumference of the tread;

integrating the so-determined wave forms of the sound extended over the entire surface of the tread; and generating audible sound on the basis of the integrated wave forms.

Further, the tire tread noise simulator in accordance with the present invention is an apparatus for simulating tire tread noise which occurs during the rotation of a tire which has a plurality of load supporting portions on a tread. This apparatus is, in order to solve the afore-mentioned problems, provided with the following means:

data processing means to represent the tread with digital data to distinguish between a leading edge which is the edge of the load-supporting portion of the tread which first comes into contact with the road surface when the tire rotates, and the trailing ege which is the other edge of the load-supporting portion and last contacts the road surface when the tire rotates;

contour determining means to determine the contour of the front edge of the contact portion of the tread which comes into contact with the road surface which is positioned at the forward portion of the contact portion which has not yet contacted the road surface and contacts the road surface when the tire rotates, and the contour of the rear edge of the contact portion of the tread, which is located at the rearward portion of the contact portion which is still in contact with the road surface and which separates from the road surface when the tire rotates;

calculating means to calculate the portion of the leading edge which crosses the contour of the front edge of the contact portion during a unit time, and a portion of the trailing edge which crosses the contour of the rear edge of the contact portion during the unit time, when the contours of the front edge and rear edge of the contact portion and the tread are relatively moved so as to move the contours of the front edge and rear edge of the contacting portion in the direction of circumference of the tread;

wave form determining means to determine the wave forms of sounds, considering the phase, which originate at sources of sound which are the respective calculated portions by the calculating means;

integrating means to integrate the so-determined wave forms of the sounds extended over the entire surface of the tread; and sound generating means to generate audible sound on the basis of the integrated wave forms.

Since the tire tread noise which occurs when the tire rotates, originates when the load-supporting portion comes into contact with the road surface and the load-supporting portion which is already in contact with the road surface separates from the road surface, it is assumed in the present invention that positions of sources of tire-tread noise are the leading edge of the load-supporting portion of the tread which first comes into contact with the road surface when the tire rotates, and the trailing edge thereof which is located at the other edge of the load-supporting portion which last comes into contact with the road surface when the tire rotates. Therefore the present invention represents the tread first by distinguishing between the leading edge and the trailing edge and then further by determining the contour of the front edge of the contact portion (footprint) of the tread which comes in contact with the road surface which is positioned at the forward portion of the contact portion which has not yet contacted the road surface and which is in contact with the road surface when the tire rotates, and the contour of the rear edge of the contact portion of the tread which is located at the opposite end of the contact portion to the front edge contour. Then, when the contours of the front edge and the rear edge of the contact portion and the tread are relatively moved so as to move the contours of the front edge and the rear edge of the contact portion in the direction of circumference of the tire, the portion of a leading edge which crosses the contour of the front edge of the contacting portion during the unit time, and another portion of a trailing edge which crosses the contour of the rear edge of the contacting portion during the unit time, are shown as sources of sound. Further waveforms of the sounds originating at each source of sound, is determined, considering the phase differences, and the so-determined waveforms of the sound extended over the entire surface of the tread is integrated. Since this invention provides that sources of sounds lie on a leading edge and a trailing edge, it is possible to specify generating portion of tire tread noise, to thereby integrate sounds, considering the phase differences of sounds generated from each source of sounds. This causes aural sound to be generated on the basis of the integrated wave forms. The vibration at each source of sound is transferred from the load-supporting portion via the tread rubber to the side wall of the tire, and damps. Such vibration is propagated in the air and then heard by listeners as tire tread noise. Consequently, it is desirable to determine the waveforms of sound as a damped waveform, considering the sound transmission characteristics of the tire.

The simulator of tire tread noise in accordance with the present invention, represents the tread with digital data in such a way as to distinguish between a leading edge and a trailing edge of a load-supporting portion, using a data-processing means. In such cases, it is preferable to represent the tread on a grid having two dimensional coordinates, for the simulation. A contour-determining means is provided to determine a contour of a front edge of a contact portion of the tread which comes in contact with the road surface and a contour of a rear edge of the contact portion. These contours may be calculated using data specific to the tire, such as the diameter of tire and the load acting upon tire, or may be determined by actually measuring the contours of the contact portion, or may be determined by optically measuring them. A calculating means is provided to calculate a portion of a leading edge which crosses the contour of the front edge of the contacting portion during the unit time, and a portion of a trailing edge which crosses the contour of the rear edge of the contact portion during the unit time when the contours of the front edge and rear edge of the contact portion and the tread are relatively moved as described above. A waveform determining means is provided to determine waveforms of sounds, considering the phase, of which sounds originate at each source of sounds which is a portion, respectively, calculated by the calculating means. An integrating means is to integrate the so-determined waveforms of the sound extended over the entire surface of the tread and a sound generating means is to generate audible sound on the basis of the integrated waveforms.

As described above, it is advantageous to be able to generate tire tread noise with high fidelity, by means of the present invention, since the tire tread noise can be generated by integrating waveforms of sounds, considering the phase, of which sound originate at sources of sound existing at a leading edge and a trailing edge of the load supporting portion of the tread of the tire.

BRIEF DESCRIPTION OF THE DRAWINGS

FIG. 4 is a enlarged schematic partial view of the crossing point between a front edge and rear edge of the footprint, and the leading and trailing edges of the load-supporting portion;

DESCRIPTION OF THE PREFERRED EMBODIMENTS

Figure 1:
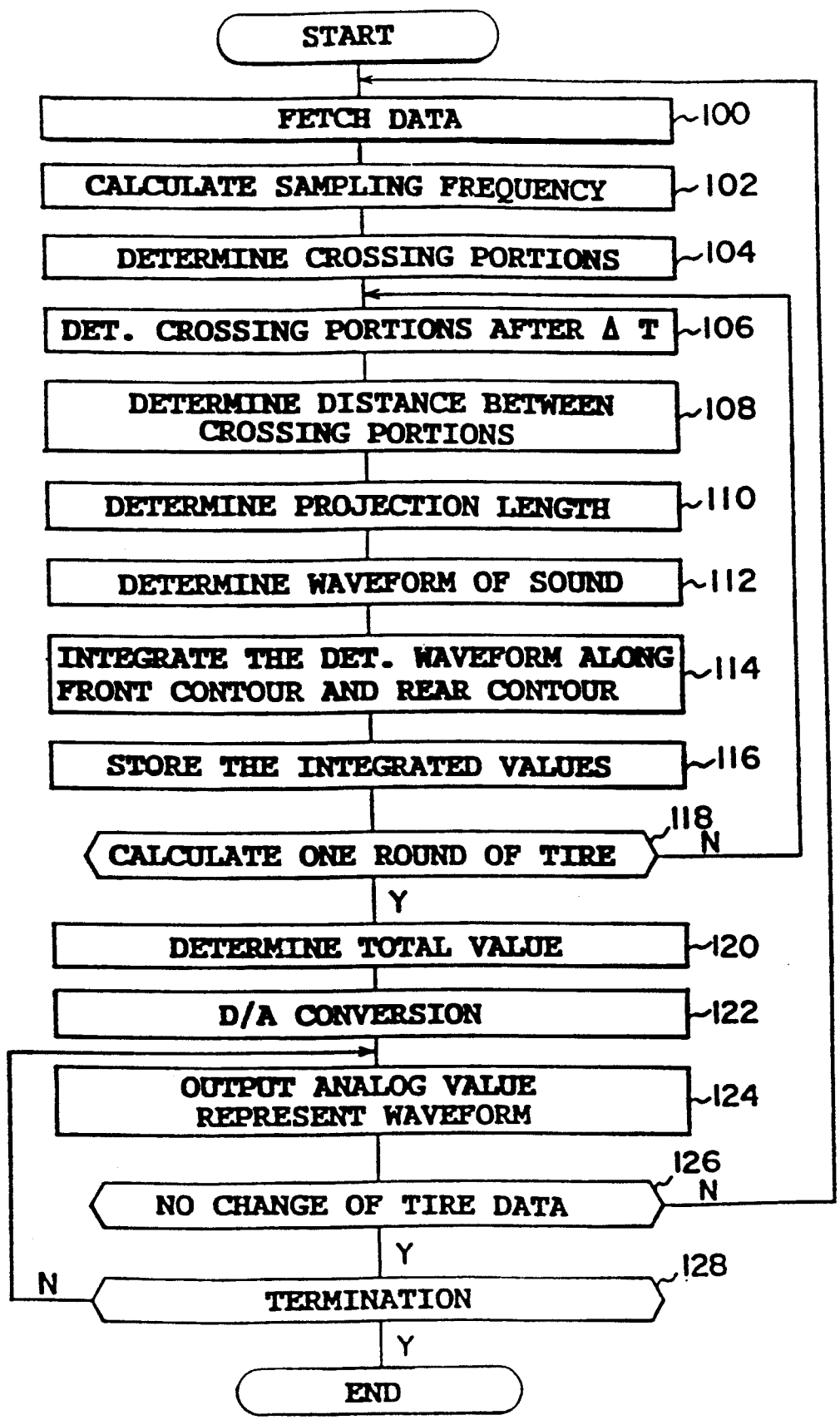
FIG. 1 is a flow chart showing the routine of a tire tread noise simulation in accordance with an embodiment of the present invention.

Referring to the drawings, the embodiment of the present invention will be more particularly explained hereinafter.

Figure 2:
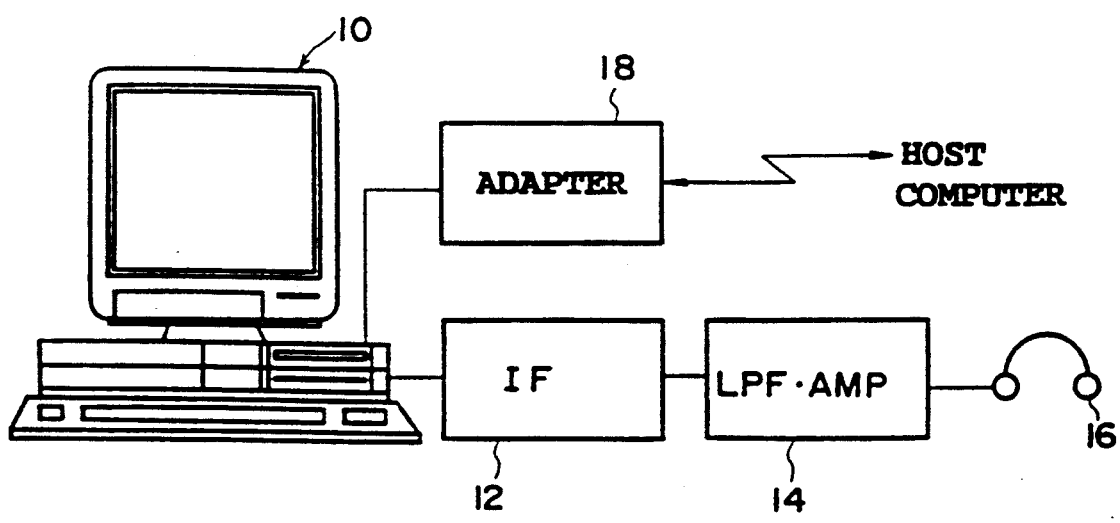
FIG. 2 is a block diagram of the tire tread noise simulator in accordance with the above embodiment.

FIG. 2 is a block diagram of tire simulator in accordance with the embodiment of the present invention. The simulator is provided with a personal computer 10 for implementing simulation. The personal computer 10 is connected, via an interface 12 and a signal processing circuit 14 having a low-pass filter (LPF) and an amplifier (AMP), to a headphone 16 for picking up tire noise. The headphone 16 may be replaced by a loud-speaker. The personal computer 10 is also connected via an adapter 18 to a host computer of a tire-design system for designing a tread pattern of a tire with a CAD system.

Next, the principle of simulation in this embodiment will be described hereinafter.

Figure 3A:
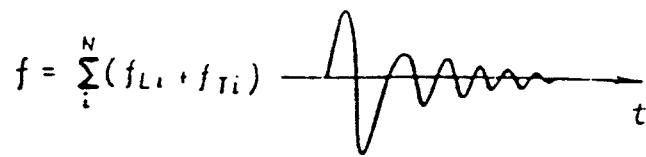
FIGS. 3A through 3D are diagrams showing the process for obtaining the total value of the waveforms of sounds.
Figure 3B:
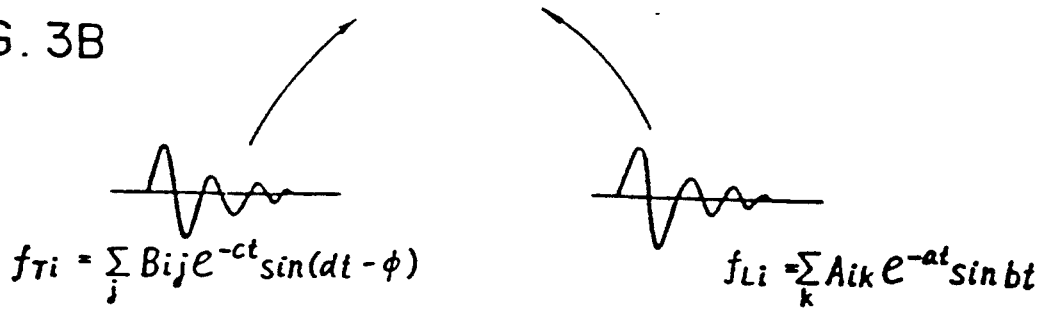
Figure 3C:
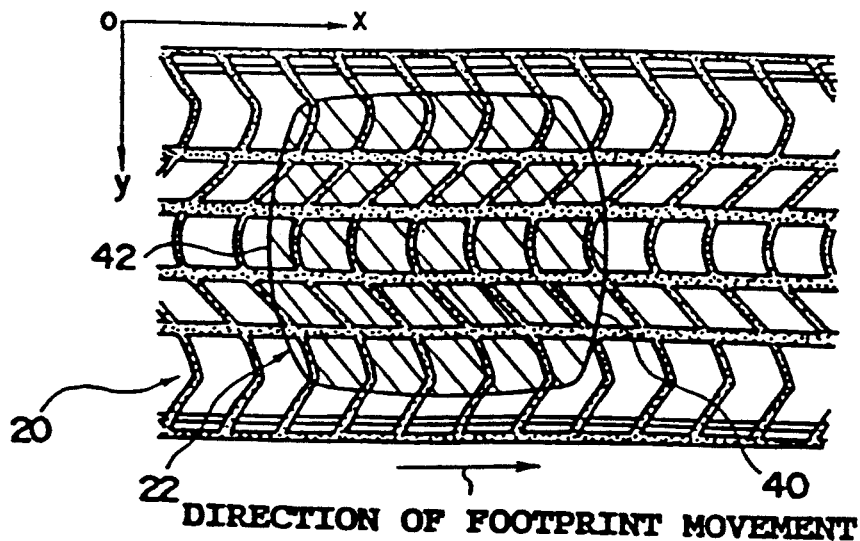
Figure 3D:
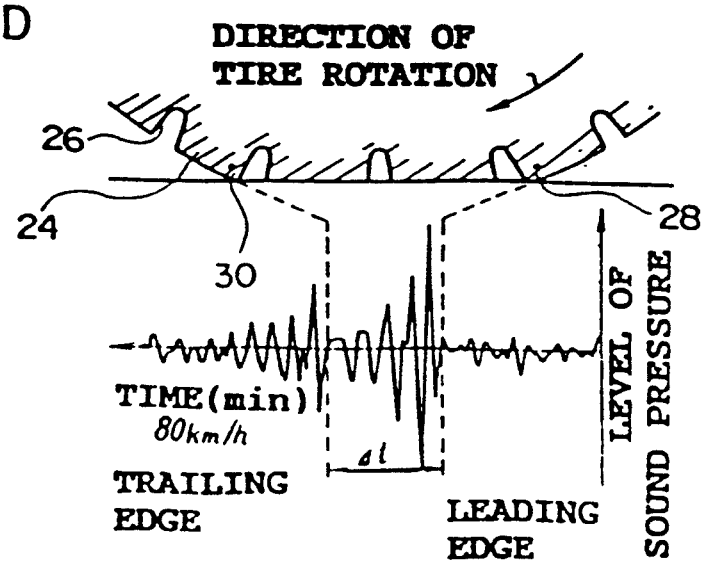

FIG. 3C is a plan view of a tread pattern which is shown on a plane surface extended in the directions of an X-axis and Y-axis, and FIG. 3D is a cross-sectional view of a tire sectioned vertically across the rotational axis of the tire, showing adjacent portions of the contact portion (footprint) in contact with the road surface. The X-axis in FIG. 3C lies in parallel with a tangent to the circumference of the tire, and the Y-axis is in parallel with the rotational axis of the tire. The tread pattern of this embodiment is shown as a two-dimensional representation of digital data on an X-Y plane surface in FIG. 3C in order to distinguish between a leading edge 28 and a trailing edge 30 of a load-supporting portion 24 of the tread. The leading edge 28 is the edge of the load-supporting portion 24 which first comes in contact with the road surface when the tire rotates, and thus, first separates from the road surface. The trailing edge 30 is the edge of the load-supporting portion 24 which last comes in contact with the road surface when the tire rotates, and thus, last separates from the road surface. The numeral 26 indicates a groove. The functions f1 (X) and f2 (X) on the X-Y plane surface are used to show the contour 40 of the front edge of the footprint 22, i.e. the contour of the footprint which has not yet contacted the road surface and which first comes in contact with the road surface when the tire rotates, and the contour 42 of the rear edge of the footprint 22, i.e. the contour of the footprint which is in contact with the road surface and which last separates from the road surface when the tire rotates. These functions may be determined by measurement, or by calculation of the contours of the footprint.

In order to represent the rotating condition of the actual tire, the footprint 22 is moved along the X-axis in the positive direction by a unit distance $\Delta$ 1 based upon the speed of the tire (the speed of movement of the tire in the horizontal direction when the tire rotates). FIG. 4 is an enlarged partial view of the load-supporting portion which is crossing the contour 40 of the front edge of the footprint and the contour 42 of the rear edge of the footprint, showing a condition in which the footprint i shown by the solid line is moved by a unit distance $\Delta$ 1 to the next position "i plus 1" shown by the dotted line. The footprint is moved the unit distance $\Delta$ 1 in the unit time $\Delta$ T. The portion of the leading edge 28 of the load-supporting portion 24 which crosses the contour 40 of the front edge of the footprint within the unit time $\Delta$ T is represented by Li1, Li2, Li3 . . . (represented by the general expression, Lik). Here, the numerals 1, 2, 3 . . . (=k) represent the order of the values in a positive direction along the Y-axis representing the portion of the leading edge 28 which crosses the contour of the front edge of the footprint. The portion of the trailing edge 30 of the load supporting portion 24 which crosses the contour 42 of the rear edge of the footprint within the unit time $\Delta$ T is represented by Ti1, Ti2, Ti3 . . . (represented by the general expression, Tij). Here, the numerals 1, 2, 3 . . . (=j) represent the order of the values in the positive direction along the Y-axis representing the portion of the trailing edge 30 which crosses the contour 42 of the rear edge of the footprint. A projection length of the crossing portions Li1, Li2, Li3 . . . Lik projected on the contour 40 of the front edge of the footprint is represented by Ai1, Ai2, Ai3 . . . (represented by the general expression, Aik). A projection length of the crossing portions Ti1, Ti2, Ti3 . . . Tij projected on the contour 42 of the rear edge of the footprint is represented by Bi1, Bi2, Bi3 . . . (represented by the general expression, Bij). The waveform of the sound which originates at each of the crossing portions Lik is represented by fik in the following general equation (1), and the waveform of the sound which originates at each of the crossing portions Tij is represented by fij in the following general equation (2).

$$fik = Aik' \exp[-at] \sin bt \tag{1}$$

$$fij = Bij' \exp[-ct] \sin (dt - \phi) \tag{2}$$

where, Aik' is the level of sound pressure of the waveform of the sound (the value from one peak to the next peak, that is twice as large as the amplitude of vibration) at the crossing portion of the leading edge of the footprint and Aik' is proportional to the projection length Aik. This level of sound pressure corresponds to the impact force.

Bij' is the level of sound pressure of the waveform of the sound at the crossing portion of the trailing edge of the footprint and it is proportional to the projection length Bij.

a is a damping coefficient of the sound at the crossing portion of the leading edge.

c is a damping coefficient of the sound at the crossing portion of the trailing edge.

b is the frequency of the sound at the crossing portion of the leading edge.

d is the frequency of the sound at the crossing portion of the trailing edge.

$\phi$ is the phase difference between the sound originating from the crossing portion of the leading edge and the sound from the crossing portion of trailing edge. t is time.

The levels Aik', Bij' are determined in accordance with the hardness of the load-supporting portion and the physical properties of the tread rubber, while being proportional to the respective projection lengths. The damping coefficients a, c and the frequency b, d are determined in accordance with the physical properties of the tread rubber and the sound transmission characteristics of the tire. The phase difference $\phi$ is determined in accordance with the time difference ($\Delta$ t shown in FIG. 3D) between the sound originating at the leading edge and the sound originating at the trailing edge, which is determined on the basis of the length of the footprint and the speed of the movement of the tire. However, the levels of the sound pressure, the damping coefficients, frequency and the phase difference are preferably determined on the basis of a test, for example, $a = 3.316 \times 10^3$, $b = 6.24 \times 10^3$. Thus, the waveforms of the sound determined by the afore-mentioned equations (1) and (2), are integrated extended over the entire surface of the tread as shown on the X-Y plane surface, and then, audible sound is generated on the basis of the integrated values.

Referring now to FIG. 1, a routine of a personal computer 10 for simulating a tire tread noise, will be explained based upon the principle of simulation as described above. In a step 100, data inputted from a host computer via an adapter 18 and stored in RAM, and data entered from a keyboard of the personal computer 10 are fetched. Such data include the length of the circumference of the tire (the average radius ×2π when the tire is rotating), the speed of movement of the tire (i.e. the speed of the tire in a horizontal direction when the tire rotates), data indicating the locations of a leading edge 28 and trailing edge 30 on the X-Y coordinate system, a function $y=f2(x)$ representing the contour of the front edge of a footprint 22, a function $y=f2(x)$ representing the contour of the rear edge of the footprint 22, and the like. Alternatively, the functions $f1(x)$, $f2(x)$ may be determined by calculation. In the next step 102, a calculation of the sampling frequency N is executed in accordance with the following expressions (3) and (4).

Time for one rotation of the tire = (3)
length of the circumference of the tire/speed of movement of the tire $N$ = time for one rotation of the tire/$\Delta T$ (4)

ΔT, a sampling time, is determined, on the basis of Nyquist theory, for example, 50 μsec. since the highest frequency component included in a manageable input signal, must not be over half the value of the sampling frequency (Nyquist theory).

In the next step 104, a crossing point of each of the leading edges 28 of the load-supporting portion 24 and a function $f1(x)$ showing the contour of the front edge of the footprint are respectively determined on the X-Y plane surface, and a crossing point of each of the trailing edges 30 of the load-supporting portion 24 and a function $f2(x)$ showing the contour of the rear edge of the footprint are respectively determined on the X-Y plane surface. In FIG. 4 the position of the footprint in the above condition is indicated as "i". In the next step 106, the position of the footprint after the time ΔT is determined (the position of i plus 1 in FIG. 4, that is, the unit distance Δl that the footprint has moved) and the crossing portions of the leading edge 28 and the contour of the front edge of the footprint, and the trailing edge 30 and the contour of the rear edge of the footprint after the time ΔT are respectively determined. In the next step 108, the distances between crossing portions of leading edge 28, i.e. the lengths of the crossing portions Li1, Li2, Li3 . . . Lik, are determined, and the distances between crossing portions of trailing edge 30, i.e. the lengths of the crossing portions Ti1, Ti2, Ti3 . . . Tij, are determined. In the next step 110, the projection lengths of the crossing portion Li1, Li2, Li3 . . . Lik projected on the contour of the front edge of the footprint, which are referred to as Ai1, Ai2, Ai3 . . . Aik, are determined, and the projection lengths of the crossing portions Ti1, Ti2, Ti3 . . . Tij projected on the contour of the rear edge of the footprint, which are referred to as Bi1, Bi2, Bi3 . . . Bij, are determined. Then, in step 112, the levels of sound pressure Aik', Bij' are substitued into the above-mentioned equations (1), (2) for the projection length Ai1, Ai2, Ai3 . . . Aik, Bi1, Bi2, Bi3 . . . Bij determined in the previous step 110, permitting the waveforms of the sound originating from each sound source on the leading edge 28 and the trailing edge 30, to be determined. Alternatively, any value proportional to the projection length, which is the level of sound pressure, may be used. In step 114, the waveform of the sound originating from each leading edge 28 along the contour of the front edge of each footprint is integrated in accordance with the following equation (5), and the waveform of the sound originating from each trailing edge 30 along the contour of the rear edge 30 of each footprint is integrated in accordance with the following equation (6) (FIG. 3B). The following equations assume that the sound originating along the contour of the front edge of the footprint, is in-phase with that along the contour of the rear edge of the footprint, and alternatively, the phase difference corresponding to a distance from each sound source to an observation point may be added and/or the phase difference φ may be determined for each sound source.

$$fLi = {}_k\Sigma Aik' \exp[-at] \sin bt \qquad (5)$$

$$fTi = {}_j\Sigma Bij' \exp[-ct] \sin (dt-\phi) \qquad (6)$$

These integrated values fLi, fTi are stored in RAM of the personal computer 10 in a step 116. In the next step 118, a decision as to whether the integrated values fLi, fTi have been each calculated N-number of times, determines whether a calculation for one round of the tire is finished or not. If the calculation for one round of the tire is not finished, the procedure returns to step 106 and the footprint is moved by the unit distance Δl (i.e. the distance of movement in the time ΔT) and the steps 106 through 118 are repeated, to thereby obtain the respective integrated values.

When the calculation for one round of the tire is finished in step 118, then, in step 120, the total value f of the waveforms extended over the entire surface of the tread is calculated by integrating the integrated values fLi and fTi for one round of the tire in accordance with the following expression (7) (FIG. 3A).

$$f = \sum_{i=1}^{N} (fLi + fTi) \qquad (7)$$

The total value f of the waveforms extended over the entire surface of the tread as calculated with the above expression (7) is converted to an analog signal in step 122. In step 124, this analog signal is output through an interface 12 and displayed on the CRT of the personal computer 10. In the next step 126, whether or not there is any modification in the data of the tire is decided, and then, if it is decided that the simulation is not finished, step 124 is repeated to sequentially perform the output of analog signals to represent the waveforms. The high-frequency (i.e. more than $1 \times 10^4$ Hz) components in the analog signals are eliminated by the low-pass filter of a signal processing circuit 14 and the signals are amplified by the amplifier, and then, an audible sound is emitted from the headphone 16. Here, a low-pass filter is employed to eliminate the high-frequency components, since the frequency band of tire tread noise is approximately 0 through $2 \times 10^3$ Hz, and so there is no need for high-frequency components above $1 \times 10^4$ Hz.

In the case that the tire tread noise generated is evaluated as "wrong" upon hearing the noise aurally, a host computer may be accessed by operating the keyboard of the personal computer 10, in order to implement modification of the tread pattern. Further, in order to determine the difference in the tire tread noise due to the speed of the movement of the tire, the speed of the movement of the tire is modified. In order to determine the change in the tire tread noise due to tire size, the length of the circumference of the tire is modified. In order to determine the change in tire tread noise due to the load acting upon the tire, the shape of the footprint is modified. Consequently, in step 126, if it is decided that there is a modification of the tire data, the procedure returns to step 100 and the afore-mentioned steps are repeated, permitting tire tread noise to be determined, which corresponds to the modified tire data.

Figure 5A:
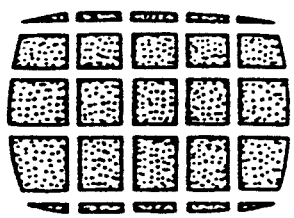
FIGS. 5A through 5C are diagrams showing and comparing the results of the actual noise and simulated one.
Figure 5B:
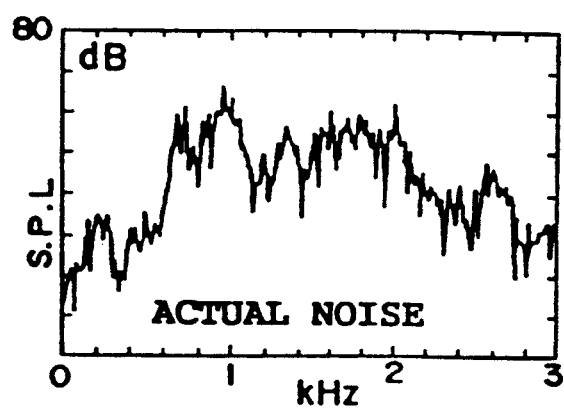
Figure 5C:
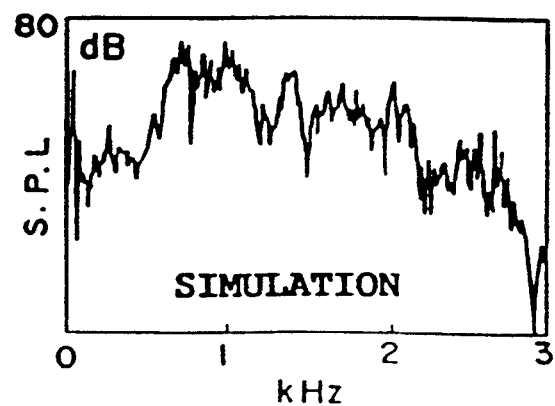
Figure 6A:
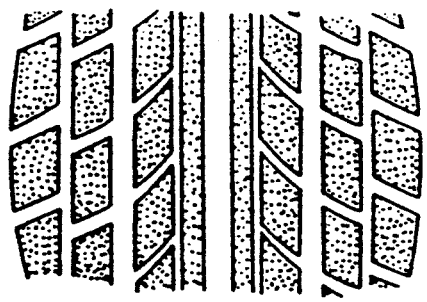
FIGS. 6A through 6E are diagrams showing and comparing the results of the actual noise and simulated one in an other tread pattern.
Figure 6B:
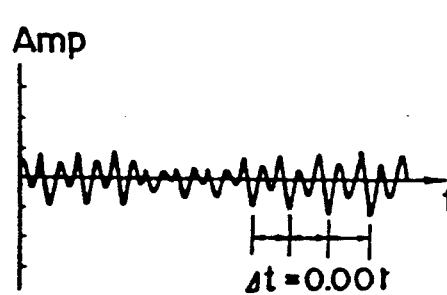
Figure 6C:
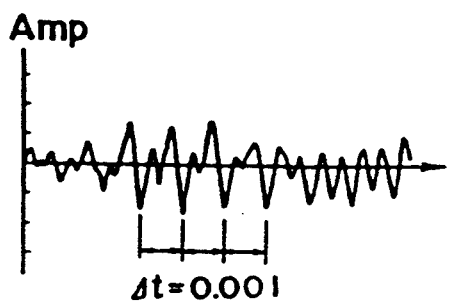
Figure 6D:
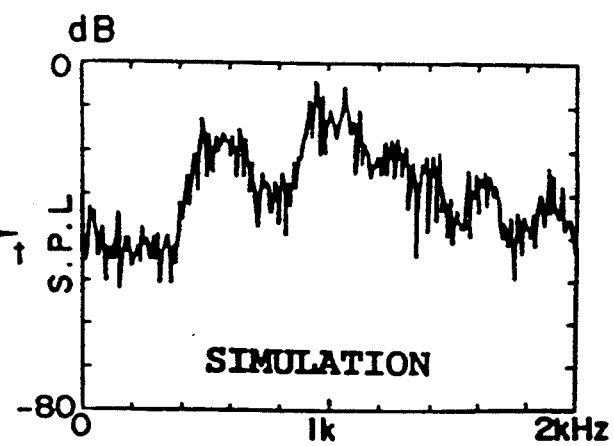
Figure 6E:
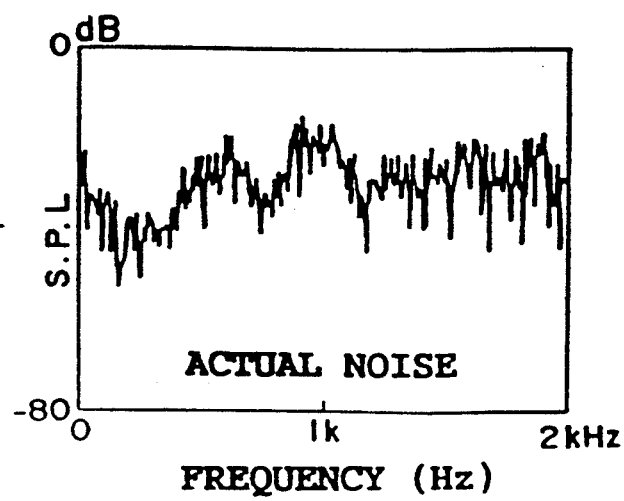

FIGS. 5 and 6 show the results of an actual simulation using the tire tread noise simulator as described above. FIG. 5 is the result of a bench test, at a speed of tire movement of 100 km/h, after processing the tread pattern to a 205/60 R15-size smooth tire as shown in FIG. 5A, which has a plurality of square load-supporting portions fixed at 60 pitches, a 3-pitch pattern, configured as three mountain-shaped blocks, a pitch ratio of 0.8:1:1.2 (pitch length ratio of 26.4 mm:33 mm:39.6 mm). FIG. 5B shows tire-noise frequency characteristics when a measurement microphone is located at a position 40 cm directly below the contour of the front edge of the footprint to measure the tire-noise. FIG. 5C shows tire-noise frequency characteristics when performing a simulation in accordance with this embodiment of the present invention and they correspond to each other in the range of 0-3 kHz. In particular, components of an order of the frequency in both cases, fixed by pitch intervals, correspond to each other very well.

FIG. 6 shows the result of a bench noise test, at a speed of tire movement of 60 km/h, after processing the tread pattern to a 205/60 R15-size smooth tire, which has 61 pitches, a 3-pitch pattern is configured as a three mountain-shaped block, and has a pitch ratio of 0.85:1:1.15 (pitch length ratio of 27.3 mm:32.1 mm:37.0 mm). FIG. 6A shows a profile of the tread pattern, FIG. 6B and 6D show a time series waveform and frequency characteristics of the tire-noise in accordance with a simulation of this embodiment. Further, FIG. 6C and 6E show a time series waveform and frequency characteristics when actually measuring the tire-noise by locating a microphone at the same position as described above. As seen in FIG. 6, the actual measuring value and the time series waveform in simulation correspond to each other very well. In fact, the simulated sound is approximately the same as the actual measured tire sound, permitting sounds to be obtained by integration for which the fidelity to real tire noise is very high. In the above tests of FIGS. 5 and 6, an internal pressure of the tire is 2.0 kg/cm² and the load is 400 kg.

As explained hereinbefore, the present embodiment of this invention permits the prediction and evaluation of tire-noise for tires of any size, any tread pattern, and any rotational speed.

Further, although the above embodiment has been explained with respect to an example in which the waveform of the sound is integrated along the contour of the footprint and then the integrated waveform is again integrated in the direction of the circumference of the tire to obtain a total value, it is also possible to integrate the waveforms of sound for one round of the tire and thereafter to integrate the integrated waveforms in the direction of circumference of the tire and further to integrate the so-integrated values in the direction of the contour of the footprint so as to obtain a total value. Or alternatively, the waveforms of sound may be integrated all at once to obtain the total value. Also, the tread pattern, which has been represented in two-dimensions herein, may be shown in three-dimensions, and a simulation can be performed by selecting from the data representing the tread pattern only data of the leading edges and trailing edges.

What is claimed is:

1. A method of generating simulated tire tread noise which occurs during the rotation of a tire which has a plurality of load-supporting portions on a tread, said method comprising the steps of:

representing the tread so as to distinguish between a leading edge which is the edge of the load-supporting portion of the tread which first comes in contact with the road surface when the tire rotates, and a trailing edge which is the opposite edge of the load supporting portion and last comes in contact with the road surface when the tire rotates;

determining a contour of a front edge of a contact portion of the tread, which comes in contact with the road surface, which is located at the forward portion of the contact portion which has not yet contacted the road surface and contacts the road surface when the tire rotates, and a contour of a rear edge of the contact portion which is located at the rearward portion of the contact portion which is in contact with the road surface and separates from the road surface when the tire rotates;

calculating a length of a portion of a leading edge which crosses the contour of the front edge of the contact portion during a predetermined period of time, and a length of a portion of a trailing edge which crosses the contour of the rear edge of the contact portion during the predetermined time when the contours of the front edge and rear edge of the contact portion and the tread are relatively moved so as to move the contours of the front edge and rear edge of the contact portion in the direction of circumference of the tread, and further calculating a phase difference between said leading edge portion and said trailing edge portion;

determining waveforms of sounds, considering said phase difference, originating at said leading edge portion and said trailing edge portion calculated in said calculating step;

integrating the so-determined waveforms of the sound extended over the entire surface of the tread; and generating audible sound on the basis of the integrated waveforms.

2. A method of generating simulated tire tread noise according to claim 1, wherein said waveforms of sound are determined as a damped waveform.

3. A method of generating simulated tire tread noise according to claim 1, further comprising the step of determining a level of sound pressure of the sound on the basis of the length of said leading edge portion and said trailing edge portion.

4. A method of generating simulated tire tread noise according to claim 1, wherein a level of sound pressure of the sound is proportional to a projection length of a crossing portion projected on the front edge and the rear edge of the contact portion.

5. The method of generating simulated tire tread noise according to claim 1, wherein the waveform of the sound originating at said leading edge portion (fik) is determined in the following equation (1), and wherein the waveform of the sound originating at said trailing edge portion (fij) is determined in the following equation (2):

$$f_{ik} = A_{ik}' \exp[-at] \sin bt \qquad (1)$$

$$fij = Bij' \exp[-ct] \sin(dt - \phi) \qquad (2)$$

wherein

- Aik'— the level of sound pressure of the sound, which occurs from sources of sound which are portions of a leading edge which crosses the contour of the front edge of the contact portion;
- Bij'—the level of sound pressure of the sound, which occurs from sources of sound which are portions of a trailing edge which crosses the contour of the rear edge of the contact portion;
- a—a damping coefficient of the sound, which occurs from sources of sound which are portion of a leading edge which crosses the contour of the front edge of the contact portion;
- b—the frequency of the sound, which occurs from sources of sound which are portions of a leading edge which crosses the contour of the front edge of the contact portion;
- c—a damping coefficient of the sound, which occurs from sources of sound which are portions of a trailing edge which crosses the contour of the rear edge of the contact portion;
- d—the frequency of the sound, which occurs from sources of sound which are portions of a trailing edge which crosses the contour of the rear edge of the contact portion;
- $\phi$—the phase difference between the sound occurring from sources of sound which are portions of a leading edge which crosses the contour of the front edge of the contact portion, and the sound occurring from sources of sound which is a portion of a trailing edge which crosses the contour of the rear edge of the contact portion; and
- t—time 6. A simulated tire tread noise generator which generates tire tread noise which occurs during the rotation of a tire which has a plurality of load supporting portions on a tread, said simulated tire tread noise generator comprising:

- data processing means to represent the tread with digital data so as to distinguish between a leading edge which is the edge of the load-supporting portion of the tread which first comes in contact with the read surface when the tire rotates, and a trailing edge which is the opposite edge of the load-supporting portion and last comes in contact with the road surface when the tire rotates;
- contour determining means to determine a contour of a front edge of a contact portion of the tread which comes in contact with the road surface which is located at the forward portion of the contact portion which has not yet contacted the road surface and contacts the road surface when the tire rotates, and a contour of a rear edge of the contact portion which is located at the rearward portion of the contact portion which has contacted the road surface and separates from the road surface when the tire rotates;
- calculating means to calculate a length of a portion of a leading edge which crosses the contour of the front edge of the contact portion during a predetermined period of time, and a length of a portion of a trailing edge which crosses the contour of the rear edge of the contact portion during the predetermined time, when the contours of the front edge and rear edge of the contact portion and the tread are relatively moved so as to move the contours of the front edge and rear edge of the contact portion in the direction of circumference of the tread, said calculating means further to calculate a phase difference between said leading edge portion and said trailing edge portion;
- waveform determining means to determine waveforms of the sounds, considering the phase difference, originating at said leading edge portion and said trailing edge portion calculated by said calculating means;
- integrating means to integrate the so-determined waveforms of the sound extended over the entire surface of the tread; and
- sound generating means to generate audible sound on the basis of the integrated waveforms.

7. A simulated tire tread noise generator according to claim 6, wherein said waveforms of the sound is determined as a damped waveform.

8. A simulated tire tread noise generator according to claim 6, further comprising means for determining a level of sound pressure of the sound on the basis of the length of said leading edge portion and said trailing edge portion.

9. A simulated tire tread noise generator according to claim 6, wherein a level of sound pressure of the sound is proportional to a projection length of a crossing portion projected on the front edge and the rear edge of the contact portion.

10. A simulated tire tread noise generator according to claim 6, wherein the waveform of the sound originating at said leading edge portion (fik) is determined in the following equation (1), and wherein the waveform of the sound originating at said trailing edge portion (fij) is determined in the following equation (2):

$$fik = Aik' \exp[-at] \sin bt \qquad (1)$$

$$fij = Bij' \exp[-ct] \sin(dt - \phi) \qquad (2),$$

wherein

- Aik'—the level of sound pressure of the sound, which occurs from sources of sound which is a portion of a leading edge which crosses the contour of the front edge of the contact portion;
- Bij'—the level of sound pressure of the sound, which occurs from sources of sound which is a portion of a trailing edge which crosses the contour of the rear edge of the contact portion;
- a—a damping coefficient of the sound, which occurs from sources of sound which is a portion of a leading edge which crosses the contour of the front edge of the contact portion;
- b—the frequency of the sound, which occurs from sources of sound which is a portion of a leading edge which crosses the contour of the front edge of the contact portion;
- c—a damping coefficient of the sound, which occurs from sources of sound which is a portion of a trailing edge which crosses the contour of the rear edge of the contact portion;
- d—the frequency of the sound, which occurs from sources of sound which is a portion of a trailing edge which crosses the contour of the rear edge of the contact portion;
- $\phi$—the phase difference between the sound occurring from sources of sound which is a portion of a leading edge which crosses the contour of the front edge of the contact portion, and the sound occurring from sources of sound which is a portion of a trailing edge which crosses the contour of the rear edge of the contact portion; and
- t—time.

* * * * *